June 23, 1953  E. E. SIVACEK  2,642,614
WINDSHIELD WIPER MECHANISM
Filed Aug. 16, 1947  2 Sheets-Sheet 1
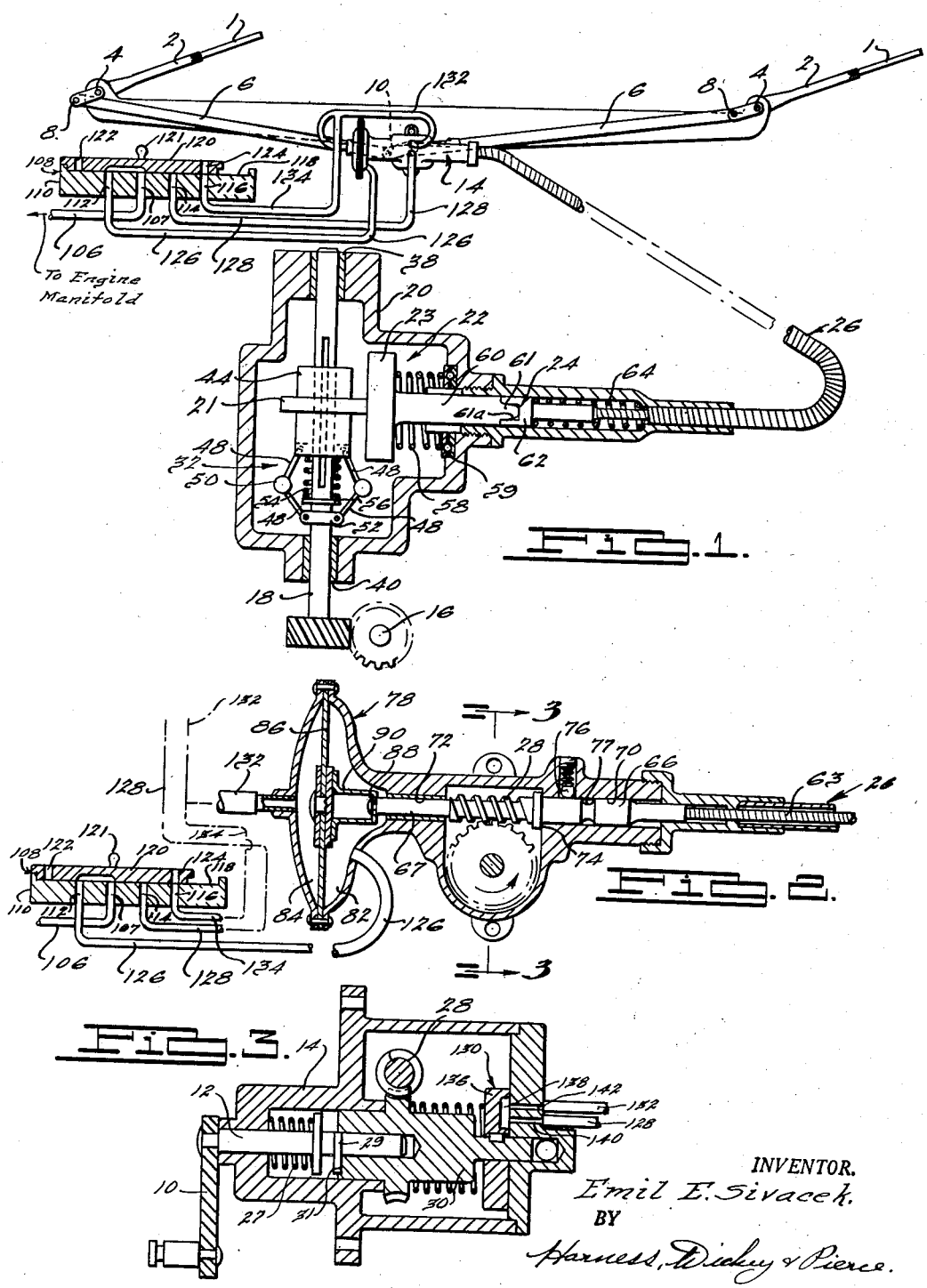
INVENTOR.
Emil E. Sivacek
BY
Harness, Dickey & Pierce
ATTORNEYS.

June 23, 1953     E. E. SIVACEK     2,642,614
WINDSHIELD WIPER MECHANISM
Filed Aug. 16, 1947     2 Sheets-Sheet 2
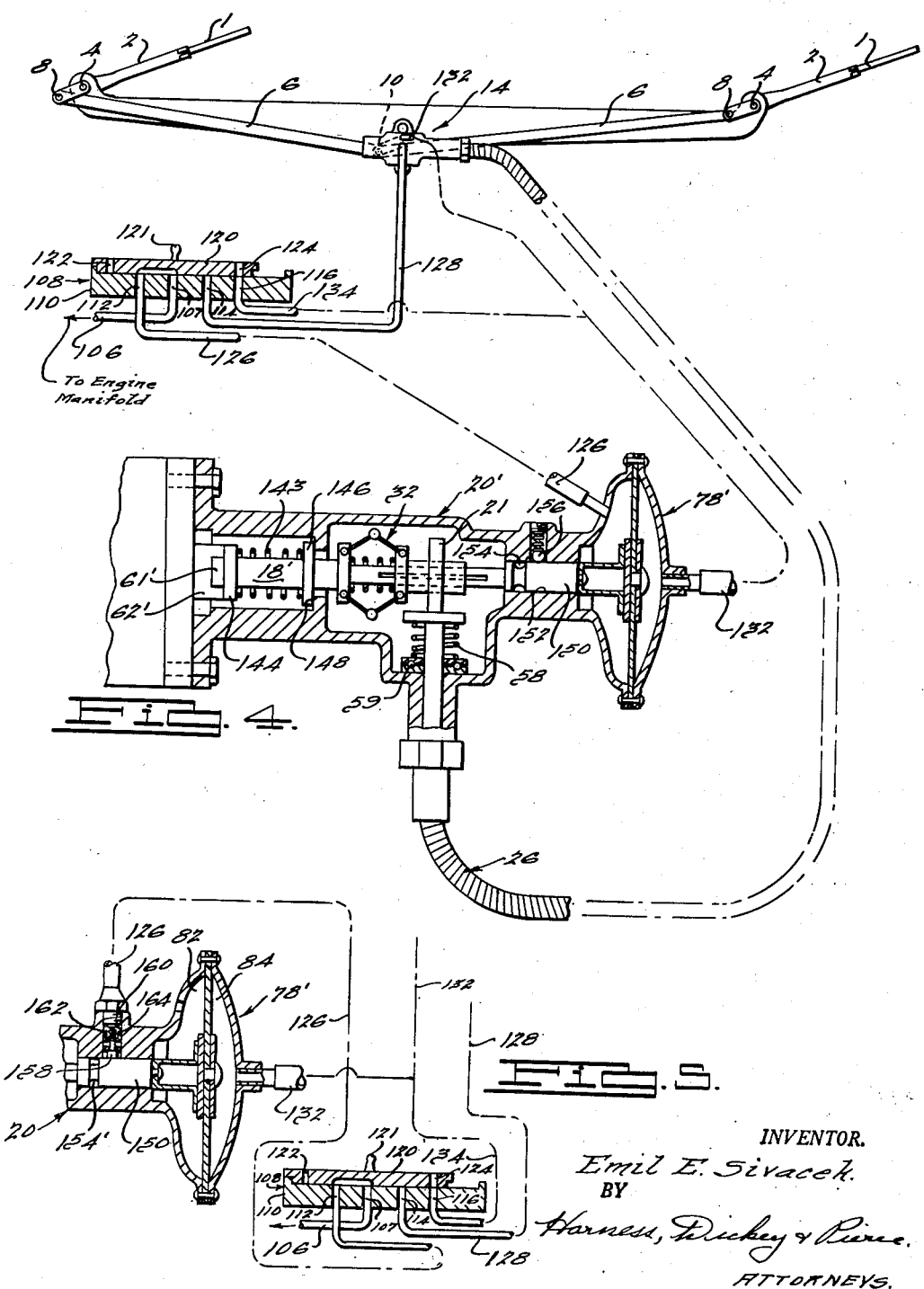
INVENTOR.
Emil E. Sivacek.
BY
Harness, Dickey & Pierce.
ATTORNEYS.

Patented June 23, 1953

2,642,614

UNITED STATES PATENT OFFICE 2,642,614

WINDSHIELD WIPER MECHANISM

Emil E. Sivacek, Ann Arbor, Mich., assignor to King-Seeley Corporation, Ann Arbor, Mich., a corporation of Michigan Application August 16, 1947, Serial No. 768,985

15 Claims. (Cl. 15—253)

The present invention relates to windshield wiper mechanism and particularly relates to controls for such mechanism whereby the windshield wiper blades may be parked in a predetermined location.

One of the primary objects of the present invention is to provide an improved means for parking of the windshield wiper blades when they are mechanically driven from a rotating part of the engine.

Another object of the invention is to provide an improved operating structure for connection with a rotating part of the engine for clutching and declutching a mechanical drive to the windshield wiping blades.

Another object of the invention is to provide an improved system for control of a fluid actuated clutch.

Another object is to provide valve means driven in accordance with a rotating part of the wiper mechanism for parking thereof.

Other objects of the invention will become apparent from the following specification, the drawings relating thereto, and from the claims hereinafter set forth. In the drawings in which like numerals are used throughout to designate like parts in the several views:

Figure 1 is a partially diagrammatic view showing a windshield wiping mechanism embodying the invention;

Fig. 2 is an enlarged view in central vertical section showing a portion of the mechanism shown in Fig. 1;

Fig. 3 is a view taken substantially along the line 3—3 of Fig. 2;

Fig. 4 is a view similar to Fig. 1 showing a modified form of the invention; and Fig. 5 is a partially schematic view showing a modified form of the fluid actuating means for the clutch mechanism in central vertical cross section.

Although the present invention is specifically illustrated as being associated with windshield wipers and while it has particular utility when so used, it will be appreciated by those skilled in the art that, in generic aspects, it has other uses within the scope of the present invention in which the drawings are to be taken as being illustrative rather than limitative of the invention which is to be limited only by the scope of the hereinafter appended claims.

Referring to the drawings, the numeral 1 designates generally a pair of wiper blades carried by the usual arm 2 in the usual pivot 4 adjacent a windshield of a motor vehicle or the like. The arm 2 and associated wiper blade 1 are rocked backwardly and forwardly over the windshield surface by means of a pair of links 6 pivotally secured as at 8 at one end portion thereof to the arm 2 and at the adjacent end portions thereof to a common crank arm 10 carried by rotating stub shaft 12 journaled within a housing 14. Energy for oscillating the blades 1 and crank arm 10 is obtained from a suitable rotating part of the engine with which the windshield wiping mechanism may be associated, and as by a shaft 16. The shaft 16 is suitably geared for driving a vertically arranged shaft 18 journaled within a housing 20. A variable speed friction type transmission mechanism generally designated 22 comprises a driving wheel 21 rotatable with but movable longitudinally of the shaft 18 and a wheel 23 arranged to be driven by the wheel 21 about an axis extending radially of the wheel 21. The wheel 23 is connected through a clutch mechanism 24 to a flexible drive shaft 26 having at its other end a worm 28 for driving a worm wheel 30 journaled in the housing 14. The stub shaft 12 is resiliently urged by spring 27 toward the wheel 30 and carries a pin 29 which is normally received within a recess 31 in the wheel 30. The spring 27 exerts sufficient force to maintain the pin 29 in recess 31 during normal operation of the wiper blades 1, however, in the event the blades 1 are manually moved, the pin 29 will ride out of the recess 31; such movement being permitted by the spring 27. Upon starting of the wiper mechanism with the pin 29 out of the recess 31, the wheel 30 will rotate until the pin 29 is again in registry with the single recess 31, at which time the spring 27 urges it thereinto and the blades 1 may again be driven by the wheel 30 in predetermined relation to the position of the blades 1.

A flyball type governor generally designated 32 is located within the housing 20 and carried by the shaft 18 for adjusting the radial position of the driving wheel 21 on the friction plate or driven wheel 23 of the transmission mechanism 22 whereby the flexible shaft 26 may be driven at a substantially constant speed irrespective of the speed of rotation of the shafts 16 and 18 which are rotated at a speed proportional to the speed of the vehicle engine. The housing 20 is provided with a pair of spaced vertically aligned bearings 38 and 40 in which the shaft 18 is journaled for rotation. The driving wheel 21 comprises a sleeve like portion 44 which is keyed to the shaft 18 and is adjustably positioned longitudinally of the shaft 18 by link arms 48 having the usual flyballs 50. A governor spring 54 is positioned concentric with the shaft 18 and has its upper end portion in abutting engagement with the lower end wall of the sleeve 44 and its other end portion abutting an annular shoulder 56 of the shaft 18 and determines the speed at which the wheel 23 will be driven. As will be obvious, an increasing speed of rotation of the shaft 18 will cause the flyballs 50 to draw the sleeve member 44 downward longitudinally of the shaft 18 whereby the driving wheel 21 will be made to engage the driven wheel 23 at a greater distance from the center of rotation thereof and conversely.

The wheel 23 has a journal portion 60 which is held in a bearing carried by the housing 20 extending in a radial direction from the wheel 21. Spring 58, located concentric with the journal portion 60, has one end portion abutting the adjacent surface of the friction plate or wheel 23 and its other end engaging an antifriction device 59 carried by the side wall of the housing 20 whereby the spring 58 may rotate with the wheel 23 and its expansive force will act to maintain the wheel 23 tightly against the peripheral surface of the driving wheel 21. The outwardly extending end of the portion 60 has a projecting tooth or drive portion 61 for engaging in a similarly shaped slot 61a in the adjacent terminal member 62 of the flexible shaft 26. The shaft 26 may be clutched to and declutched from the friction plate 23 by longitudinally moving the rotatable member 63 thereof. A spring 64 is arranged concentrically about a reduced diameter shank portion of the member 62 and is of such a length that when the member 62 is in its driving portion with the tooth 61 in the slot 61a, the spring 64 will be unstressed and free to rotate with the member 62 or rest in the end portion of the housing of cable 26 as the case may be.

As shown in Fig. 2, the worm 28 has oppositely extending journal portions 66 and 67 which are rotatable and longitudinally movable in bearings 70 and 72 respectively provided in the housing 14. The longitudinal position of the worm 28 within the housing 14 and consequently the clutching of the member 62 with the tooth 61 is controlled by a fluid actuator 78. The fluid actuator 78 comprises a pair of fluid chambers 82 and 84 having a flexible diaphragm 86 serving as a common wall; the center of the diaphragm 86 being in substantial axial alignment with the worm 28. The journal portion 67 extends completely through the bearing 72 and has a circumferential groove 88 therein providing a pair of spaced shoulders. A substantially U-shaped member 90 has its open end suitably secured to the diaphragm 86 and has a central aperture through its bottom wall through which the journal portion 67 extends whereby the bottom wall is held between the spaced shoulders formed by the circumferential groove 88. As the diaphragm 86 flexes under a differential in pressure between that in the chamber 82 and that in the chamber 84, the worm 28 will be moved longitudinally to the right or to the left whereby the movable member 63 will be longitudinally moved for clutching and unclutching the member 62 with the tooth 61. The position of the diaphragm 86 with the member 62 clutched to the tooth 61 is substantially planar as shown and the length of the parallelly extending arms of the member 90 is preferably chosen with respect to the position of the diaphragm under the differential in pressure between the chambers 82 and 84 normally maintained during operation of the windshield wiper mechanism so that little if any frictional force is exerted by member 90 against the shoulders of the groove 88 during rotation of the shaft 26.

The direction of rotation of the worm 28 is chosen so that when the worm 28 is driving the wheel 30, the reaction force will tend to maintain a circumferential shoulder 74 of the worm 28 against the adjacent end wall of the bearing 70 in which position the rotatable member 63 is in its longitudinally moved position to provide clutching of the member 62 with the tooth 61. Upon operation of the actuator 78 in the opposite direction, the worm 28 and rotatable member 63 will be longitudinally moved against the force of the spring 64 to unclutch the member 62 from the tooth 61 in which position a spring pressed ball detent 76 will move into a circumferential recess 77 of the journal portion 66. The holding force of the detent 76 is sufficient to hold the member 63 against movement under the force of the spring 64 with no pressure differential between the chambers 82 and 84 but is insufficient to hold the member 63 against movement to clutching position of the member 62 with tooth 61 when the pressure in chamber 82 is lower than that in chamber 84.

Any suitable source of differential in fluid pressure may be utilized to actuate the diaphragm 86. However, since the windshield wiper mechanism herein described is particularly adapted for use on a motor vehicle the low pressure in the intake manifold of the conventional engine with which most motor vehicles are operated may be used to provide the reduced pressure and the atmospheric pressure may be used to provide the higher pressure for actuation of the diaphragm 86. As shown the intake manifold of the engine or any other sub-atmospheric pressure is conducted through a conduit 106 having one end connected to the intake manifold of the motor vehicle engine and its other end connected to a port 107 of a three-way valve 108 diagrammatically shown as comprising a base portion 110 having ports 107, 112, 114 and 116 opening through an upper surface 118. A movable plate 120 is adapted to be moved as by the knob 121 whereby the port 107 may be selectively connected with either of the ports 112, 114. With the valve in the extreme right-hand or parked position, the port 112 is connected to atmosphere through a port 122 in the plate 120 and the port 107 is connected with port 114; the port 116 being closed. The port 116 is connected to atmosphere through a port 124 and the port 112 is connected to the port 107 with the port 114 closed when the valve 108 is in running position. The port 112 is connected by a conduit 126 directly to the pressure chamber 82 of the fluid actuator 78. The port 114 is connected by a conduit 128 to a rotary valve 130. Conduit 132 connects the valve 130 with the fluid pressure chamber 84. A conduit 134 connects the port 116 with the conduit 132 intermediate the valve 130 and the chamber 84.

The valve 130 comprises a rotatable disk 136 having a passageway 138 which periodically connects ports 140 and 142 to establish fluid flow communication therebetween. The conduit 128 is connected to the port 140 while the conduit 132 is connected to the port 142. It will therefore be obvious that once during each revolution of the worm wheel 30 the ports 140 and 142 will be interconnected for fluid flow by means of the passageway 138 and fluid flow through the conduits 132 and 128 will be prevented during the other remaining portion of the rotatable member 136. By properly positioning the rotatable member on the worm wheel 30 the conduits 128 and 132 may be opened for fluid flow therebetween and at such a position of the stroke of the wiper blades 1 that the diaphragm 86 will be operated to declutch the member 62 from the tooth 61 so that windshield wiper blades 1 will come to rest in a desired predetermined parked position.

It is believed that the remaining details of construction may best be described by reference to the operation of the windshield wiper system which is as follows:

During engine operation sub-atmospheric pressure will be maintained in the engine manifold and consequently in the conduit 106. Such sub-atmospheric pressure will be communicated by the conduit 106 to the port 107. With the valve 108 in the left or run position, as shown, the port 107 is in communication with the port 112 and the port 116 is open to atmospheric pressure through the port 124. Sub-atmospheric pressure is communicated from the conduit 106 through the ports 107 and 112 and the conduit 126 to the pressure chamber 82. Atmospheric pressure is communicated to the chamber 84 through the ports 116, 124 and conduits 134 and 132 whereby the diaphragm 86 holds the worm 28 in a right-hand position, as viewed in Fig. 2, in which the recess 77 is out of holding relation with the spring detent 76 and the member 62 clutched to the tooth 61. The engine accessory to which the shaft 16 is connected will drive the shaft 18 which in turn drives the wheels 21 and 23 for driving the rotatable member 63. Rotation of the rotatable member 63 rotates the worm 28 driving the wheel 30 for rotating the stub shaft 12 and consequently the windshield wiper blades 1. If during the time that the valve 108 was in parked position, the wipers 1 had been manually moved away from their parked position, the windshield wipers 1 will not commence to rotate until such time that the pin 29 and slot 31 come into registry. As such time, the spring 26 forces the pin 29 into the slot 31 and the wiper 1 will be driven by the engine as long as the valve 108 is in the run position.

Because in the usual operation of a motor vehicle the speed of the engine varies considerably, the flyball governor 32 is provided by which the driving wheel 21 is moved up and down vertically on the shaft 18. The circumferential surface of wheel 21 will engage the driven wheel 23 at various radial distances so that the rotational speed of the wheel 23 relative to that of the wheel 21 will be varied. The governor 32 is so arranged that as the speed of the shaft 18 increases the wheel 21 will be drawn downwardly engaging the driven wheel 23 at a greater radius whereby the more rapid rotation of the member 21 will act to drive the driven wheel 23 at substantially the same speed. Conversely if the speed of the motor decreases, the centrifugal force exerted by the flyball 50 will be less and the spring 54 will be permitted to move the driving wheel 21 upwardly to drive the driven wheel 23 at a lesser radius whereby the slower rotational speed of the driven wheel 21 will drive the driven wheel 23 at substantially the same speed as before.

When it is desired to park the blades 1, the valve 108 is moved to the parked position or to the right from that shown. Sub-atmospheric pressure will then be communicated from the port 107 to the port 114 and through the conduit 128 to the valve 130. Atmospheric pressure is now admitted through the ports 122 and 112 through conduit 126 to the pressure chamber 82 without effect. When the rotatable member 136 presents its passageway 138 so that it interconnects the ports 140 and 142 this sub-atmospheric pressure will be transmitted through the conduit 132 to the pressure chamber 84. When the valve 130 opens the source of sub-atmospheric pressure to the chamber 84, the diaphragm 86 is flexed to the left as seen in Fig. 2 thereby moving the worm wheel 28 bodily to the left and moving the rotatable member 63 so that the member 62 is declutched from the rotating tooth 61. Rotation of the rotatable member 63 will stop almost immediately due to the relatively small amount of inertia in the moving parts. Movement of the worm 28 will also cause a slight advance in rotation of the worm wheel 30 whereby the windshield wiper blades 1 are moved into parked position.

In Figs. 4 and 5, somewhat modified forms of the invention are provided. In Fig. 4, the fluid motor 78′ which corresponds in general to the fluid motor 78 is provided on the shaft 18′ and forms part of the housing 20′ bolted to the engine accessory as shown rather than as shown in Fig. 2 adjacent the worm 28 and forming part of the housing 14. The shaft 18′ in Fig. 4 contains a single tooth 61′ which is engageable with a rotatable member 62′ of the engine accessory so that the shaft 18′ is directly clutched thereto and declutched therefrom. A spring 143 is arranged concentrically with the shaft 18′ and acts to urge the member 62′ into clutching engagement with the tooth 61′. One end of the spring 143 abuts a flange 144 of the shaft 18′ and the other end engages a washer 146 loosely received on the shaft 18′ and engageable with a shoulder 148 of the housing 20. With the tooth 61′ clutched to the member 62′, the spring 143 exerts no force and consequently is free to remain stationary or to rotate with the shaft 18′ similarly to the spring 64 and member 62. In this form, it is unnecessary for the movable member 63 of the flexible shafting to move longitudinally and therefore the spring 64 may be omitted and neither will member 63 be required to rotate except when the wiper mechanism is being operated to reciprocate the blades 1. In this form a journal portion 150 similar to the journal portion 67 is operatively connected to the diaphragm 86 and is slidably held for reciprocal movement in a bearing 152. A circumferential recess 154 cooperates with a spring pressed ball detent 156 in a manner similar to the recess 77 and detent 76 and acts to hold the shaft 18′ in a position in which the tooth 61′ is declutched from the member 62′. In other respects the modification shown in Fig. 4 is similar to the form shown in Figs. 1, 2, and 3 inclusive and acts to drive and park the windshield wiper blade 1 in a manner similar to that described with respect to the first-mentioned form upon operation of the control valve 108. It is therefore, deemed unnecessary to complicate this specification by providing a detailed explanation of the operation thereof.

In Fig. 5 there is shown a modified form of detent mechanism in which the journal portion 150 is provided with a straight walled slot or circumferential recess 154′ with which a pressure-actuated catch 158 is cooperable. The housing 20′ is provided with a piston chamber 160 in which is reciprocally positioned a piston 162 carrying the catch 158. The piston 162 is normally urged in an inward direction toward the journal portion 150 by spring 164. In this modification, the conduit 126, instead of being connected to the chamber 82, is connected to the piston chamber of the housing 20′ above the piston 162, so that when the valve 108 is rotated to run position, sub-atmospheric pressure will be transmitted from the valve port 112 to the space above the piston 162 whereby the piston 162 will be moved outwardly, releasing the catch 158 from the circumferential groove or recess 154′, permitting the spring 143 to move the shaft 18′ to the left, as seen in Fig. 4, whereby the tooth 61′ is clutched with the member 62'. Since during running operation sub-atmospheric pressure will always be maintained in the port 112 and consequently in the chamber space above the piston 162, the catch 158 will be held outwardly from the journal portion 150 and will not impede to rotational movement of the shaft 18'. In all other respects the operation of the modification of the form shown in Fig. 5 is the same as that of the form shown in Fig. 4 and a detailed explanation is deemed unnecessary.

What is claimed and is desired to be secured by United States Letters Patent is as follows:

1. In a mechanism of the character described, a rotating part adapted to be driven by a source of power, a reciprocal member driven by said part and adapted to drive a reciprocating element, a clutch mechanism adapted to declutch said part from said source, a fluid pressure actuator for controlling the declutching of said mechanism, valve means controlling said actuator and actuatable by said part at a desired reciprocal position of said member, and means rendering said valve means inoperable to actuate said actuator at all other reciprocal positions of said member whereby the element may be parked at a desired position.

2. In a windshield wiping mechanism, a rotating part adapted to be driven by a source of power at substantially constant speed, a reciprocal member driven by said part and adapted to drive a wiper, a clutch mechanism adapted to declutch said part from said source, a fluid pressure actuator for controlling the declutching of said mechanism, and valve means controlling said actuator and actuatable by said part at a desired reciprocal position of said member, and means rendering said valve means inoperable to actuate said actuator at all other reciprocal positions of said member whereby the wiper may be parked at a desired position.

3. In a windshield wiping mechanism, a rotating part adapted to be driven by a source of power, a reciprocal member driven by said part and adapted to drive a wiper, a clutch mechanism adapted to declutch said part from said source, a fluid pressure actuator for controlling the declutching of said mechanism, and rotatable valve means controlling said actuator and having a part thereof rotatable with said first named part, said valve means being operable to actuate said actuator in a single rotary position of said part whereby the wiper may be parked at a desired position.

4. In a windshield wiping mechanism, a rotating part adapted to be driven by a source of power at substantially constant speed, a reciprocal member driven by said part and adapted to drive a wiper, a clutch mechanism adapted to declutch said part from said source, a fluid pressure actuator for controlling the declutching of said mechanism, valve means controlling said actuator and actuatable by said part at a single desired reciprocal position of said member whereby the wiper may be parked at a desired position, and manually operable means for selectively rendering said valve means ineffective.

5. In a windshield wiping mechanism for an automotive vehicle, means adapted to be driven by a rotating part of the vehicle engine and including an output element, a rotating drive member operatively connected to said element, a reciprocating member operable to drive a wiper, means coupling said drive member to said reciprocating member and including a rotating portion the rotative position of which is proportional to the reciprocative position of said reciprocating member, conduit means adapted to be connected to a fluid pressure differential maintaining means, a clutch mechanism for connecting and disconnecting said drive member to and from said element, a fluid pressure actuator for controlling said clutching mechanism, and valve means controlled by said rotating portion and operable at a single position of said rotating portion to control the fluid pressure at said actuator whereby said clutch mechanism is operable to disconnect said drive member so that the wiper will be parked in a given position.

6. In a windshield wiping mechanism for an automotive vehicle, means adapted to be driven by a rotating part of the vehicle engine and including an output element, a rotating drive member operatively connected to said element, a reciprocating member operable to drive a wiper, means coupling said drive member to said reciprocating member and including a rotating portion the rotative position of which is proportional to the reciprocative position of said reciprocating member, conduit means adapted to be connected to a fluid pressure differential maintaining means, a clutch mechanism for connecting and disconnecting said first-named means to and from the engine rotating part, a fluid pressure actuator for controlling said clutching mechanism, and valve means controlled by said rotating portion and operable at a single position of said rotating portion to control the fluid pressure at said actuator whereby said clutch mechanism is operable to disconnect said drive member so that the wiper will be parked in a given position.

7. In a windshield wiping mechanism for an automotive vehicle, means adapted to be driven by a rotating part of the vehicle engine, said means including a driven element, a rotating drive member driven by said means, a crank arm driven by said member, a reciprocating member connected to said arm, conduit means adapted to be connected to a fluid pressure differential maintaining means, a clutch mechanism for clutching said rotating member to the engine part, a fluid pressure actuator for said clutching mechanism and operable at a predetermined pressure differential to declutch said rotating member from the engine part, and rotating valve means rotatable in synchronism with said arm and operable at a single rotative position thereof to provide said predetermined pressure to said actuator whereby the rotation of said rotating member will be arrested at a given position.

8. In an apparatus of the character described, a longitudinally movable rotatable shaft adapted to be rotated by a source of power, a friction wheel, a rotating drive member driven by said wheel and adapted to drive a wiper blade, a rotatable drive wheel carried by said shaft and engaging said friction wheel for rotating said friction wheel, said friction wheel being rotatable by and longitudinally movable relative to said shaft, governor means responsive to the speed of rotation of said shaft and operatively connected to control the longitudinal position of said friction wheel relative to said shaft whereby said friction wheel is rotated at substantially constant speed irrespective of the speed of rotation of said shaft, clutch means operable to clutch said shaft to and declutch said shaft from the power source, and means responsive to the rotative position of said drive member for declutching said shaft at a predetermined rotative position of said disk.

9. In a windshield wiping mechanism adapted to be connected to a source of rotative power, means for reciprocably moving a wiper blade, a housing member, a rotative element operatively connected to said means and having a portion carried within said housing and movable with respect thereto, a pair of cooperable clutching elements, one of said pair of elements being adapted to be continually rotated by the source, the other of said pair of elements being carried by said rotative element, means urging said pair of elements into clutching position for drive of said rotative element by the source, a fluid pressure actuator operable upon actuation to move said rotative element portion relative to said housing whereby said pair of elements are separated, and control means for said actuator rotated in timed relation with said reciprocably moving means and operable at a single position thereof to actuate said actuator whereby the blade is parked in a desired position.

10. In a windshield wiping mechanism adapted to be connected to a source of rotative power, means for reciprocably moving a wiper blade, a housing member, a rotative element operatively connected to said means and having a portion carried within said housing and movable with respect thereto, a pair of cooperable clutching elements, one of said pair of elements being adapted to be continually rotated by the source, the other of said pair of elements being carried by said rotative element, means urging said pair of elements into clutching position for drive of said rotative element by the source, a fluid pressure actuator operable upon actuation to move said rotative element portion relative to said housing whereby said pair of elements are separated, control means for said actuator rotated in timed relation with said reciprocably moving means and operable at a single position thereof to actuate said actuator whereby the blade is parked in a desired position, and means for holding said rotative element in its moved position.

11. In a windshield wiping mechanism adapted to be connected to a source of rotative power, means for reciprocably moving a wiper blade, a housing member, a rotative element operatively connected to said means and having a portion carried within said housing and movable with respect thereto, a pair of cooperable clutching elements, one of said pair of elements being adapted to be continually rotated by the source, the other of said pair of elements being carried by said rotative element, means urging said pair of elements into clutching position for drive of said rotative element by the source, a fluid pressure actuator operable upon actuation to move said rotative element portion relative to said housing whereby said pair of elements are separated, control means for said actuator rotated in timed relation with said reciprocably moving means and operable at a single position thereof to actuate said actuator whereby the blade is parked in a desired position, and spring actuated detent means for holding said rotative element in its moved position.

12. In a windshield wiping mechanism adapted to be connected to a source of rotative power, means for reciprocably moving a wiper blade, a housing member, a rotative element operatively connected to said means having a portion carried within said housing and movable with respect thereto, a pair of cooperable clutching elements, one of said pair of elements being adapted to be continually rotated by the source, the other of said pair of elements being carried by said rotative element, means urging said pair of elements into clutching position for drive of said rotative element by the source, a fluid pressure actuator operable upon actuation to move said rotative element portion relative to said housing whereby said pair of elements are separated, control means for said actuator rotated in timed relation with said reciprocably moving means and operable at a single position thereof to actuate said actuator whereby the blade is parked in a desired position, and fluid pressure means for locking said rotative element in its moved position.

13. In a windshield wiper mechanism, a flexible tubular housing, a flexible drive member located within said housing and being rotatable and longitudinally movable with respect thereto, means adapted to drive said member from a rotating member and including a clutch mechanism operable to be rendered ineffective to drive said member upon longitudinal movement thereof, a fluid pressure actuator having a movable wall, means operatively connecting said wall to said drive member whereby the position of said wall is operable to determine the longitudinal position of said drive member, means operatively connected to said drive member for rotation thereby and adapted to reciprocate a windshield wiper blade, fluid pressure control means for said actuator, and means controlled in accordance with the reciprocative position of the blade for actuation of said control means whereby said clutch mechanism is rendered ineffective to drive said member.

14. In a windshield wiper mechanism, a flexible tubular housing, a flexible drive member located within said housing and being rotatable and longitudinally movable with respect thereto, means adapted to drive said member from a rotating member and including a clutch mechanism operable to be rendered ineffective to drive said member upon longitudinal movement thereof, a fluid pressure actuator having a movable wall, means operatively connecting said wall to said drive member whereby the position of said wall is operable to determine the longitudinal position of said drive member, means operatively connected to said drive member for rotation thereby and adapted to reciprocate a windshield wiper blade, fluid pressure control means for said actuator, means controlled in accordance with the reciprocative position of the blade for actuation of said control means whereby said clutch mechanism is rendered ineffective to drive said member, and releasable means operable to maintain said drive member in its longitudinally moved position.

15. The combination of claim 14 in which said releasable means is a spring pressed detent member.

EMIL E. SIVACEK.

References Cited in the file of this patent

UNITED STATES PATENTS

| Number | Name | Date |
|---|---|---|
| 397,716 | Hart | Feb. 12, 1889 |
| 864,547 | Lemmon | Aug. 27, 1907 |
| 2,031,830 | Hansmann | Feb. 25, 1936 |
| 2,079,573 | Lauer | May 4, 1937 |
| 2,243,016 | Prichard | May 20, 1941 |
| 2,388,857 | Lindsley | Nov. 13, 1945 |